W. C. DAYTON.
APPARATUS FOR MAKING GAS FROM LIQUID HYDROCARBONS.
APPLICATION FILED APR. 29, 1914.

1,174,970.

Patented Mar. 14, 1916.
3 SHEETS—SHEET 2.

Witnesses:
A. W. Macumber
Geo. L. Moore

Inventor:
Walter Clint Dayton
by A. W. Macumber
Atty.

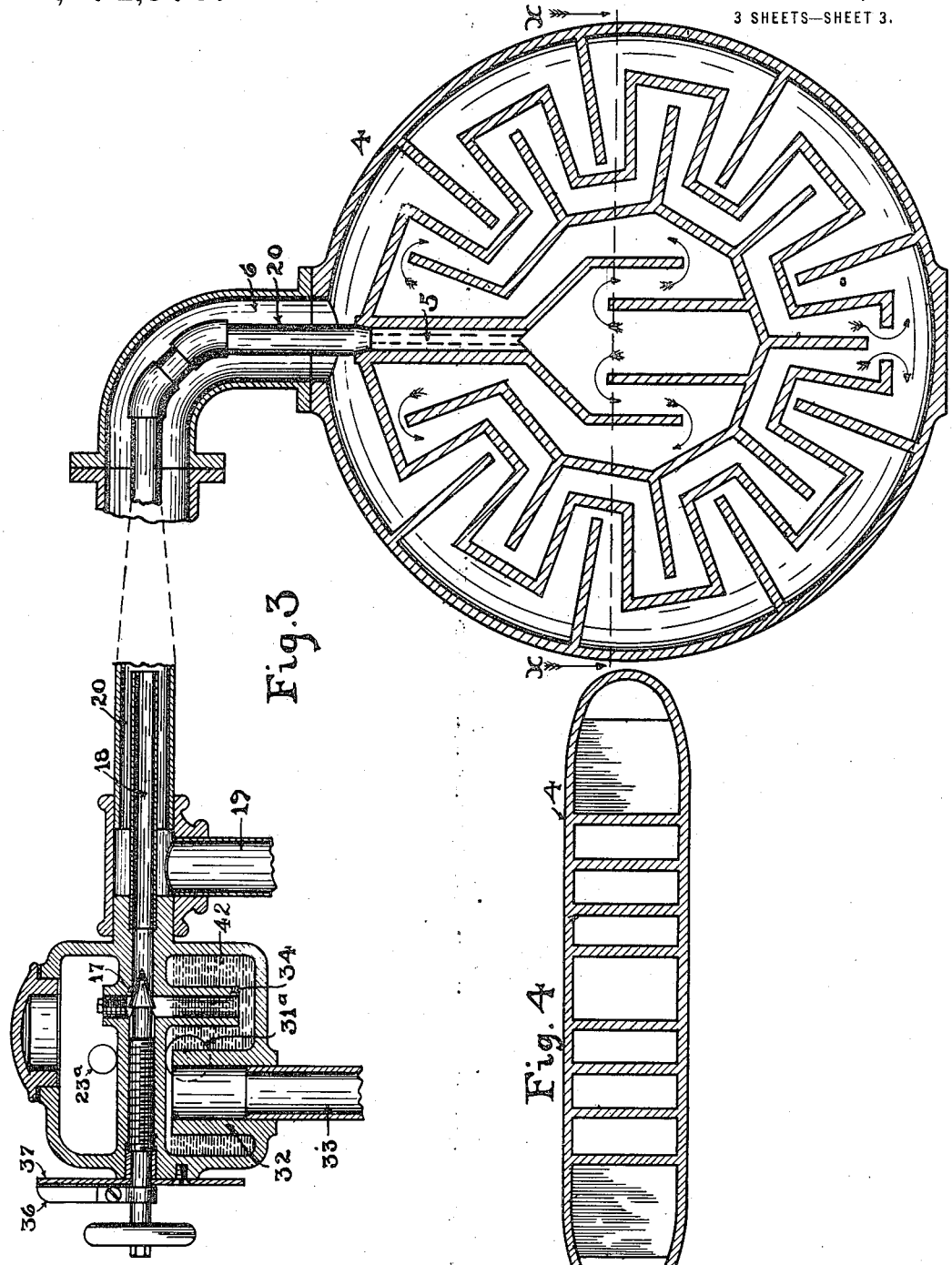

UNITED STATES PATENT OFFICE.

WALTER CLINT DAYTON, OF BUFFALO, NEW YORK, ASSIGNOR TO GEORGE H. SMITH, TRUSTEE, OF BUFFALO, NEW YORK.

APPARATUS FOR MAKING GAS FROM LIQUID HYDROCARBONS.

1,174,970.    Specification of Letters Patent.    Patented Mar. 14, 1916.

Original application filed February 5, 1914, Serial No. 816,761. Divided and this application filed April 29, 1914. Serial No. 835,309.

*To all whom it may concern:*

Be it known that I, WALTER CLINT DAYTON, a citizen of the United States, residing at Buffalo, in the county of Erie and State of New York, have invented certain new and useful Improvements in Apparatus for Making Gas from Liquid Hydrocarbons, of which the following is a specification.

My invention relates to improvements in apparatus for making gas from liquid hydrocarbons.

More particularly it relates to apparatus for making such gas in the form of a fixed gas of uniform quality, regardless of the volume produced.

It relates, furthermore, to an apparatus which is capable of converting into a fixed gas the maximum of thermal units in a given quantity of hydrocarbon.

The invention herein described and claimed is a division of my application, Serial No. 816,761, filed February 5, 1914, and consists of new and useful apparatus for carrying out the process of said application which is therein fully described.

The invention herein described while relating more particularly to the manufacture of combustible gas comprises in one of its aspects a means for mixing and feeding a liquid combustible and a combustion supporting gas in maintained proportionality whether for gasifiers which make gas by partial combustion or any other purpose.

Other new and useful features of my invention will be evident from the following specification and claims, and from the drawings herewith in which,—

Figure 1:
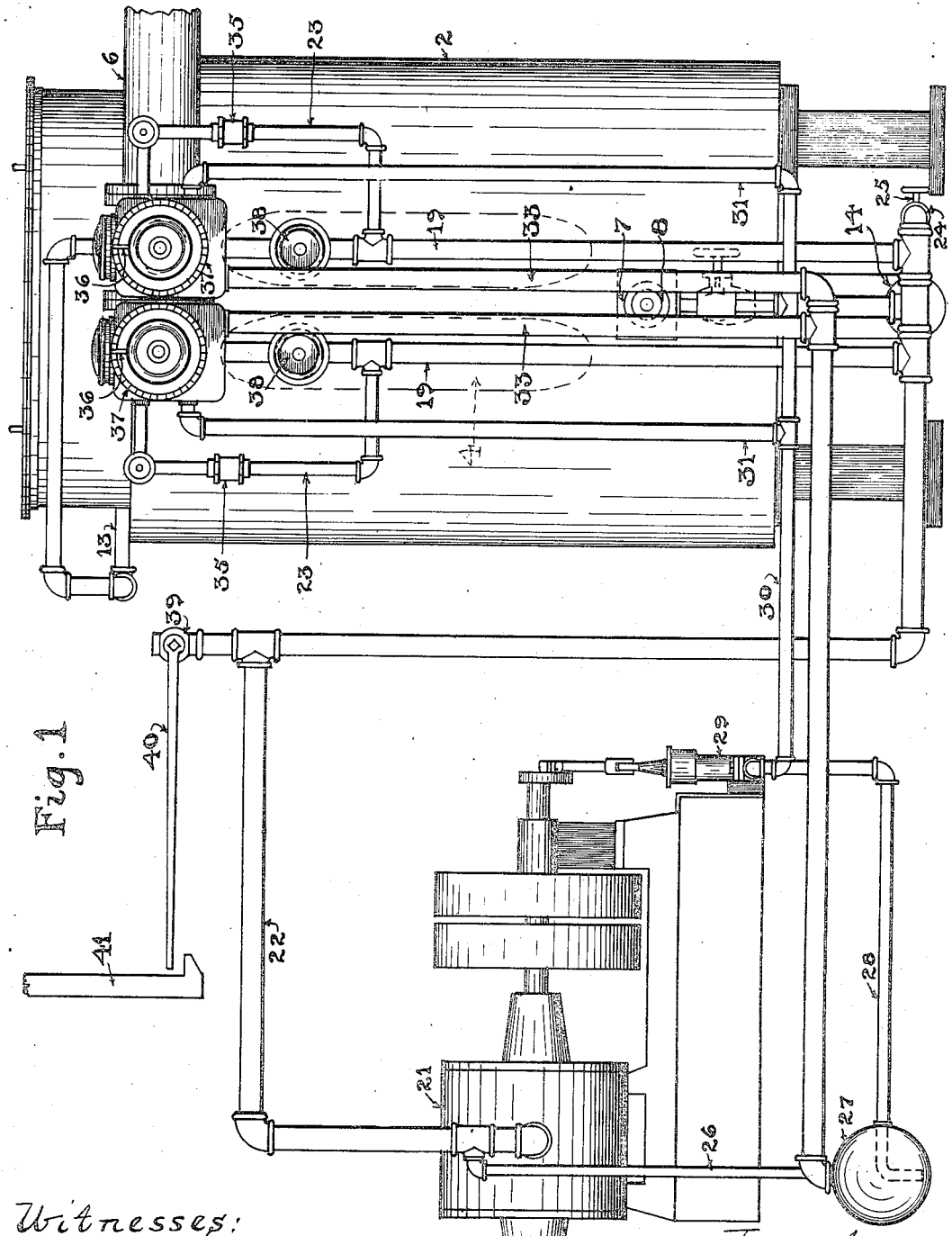
Figure 2:
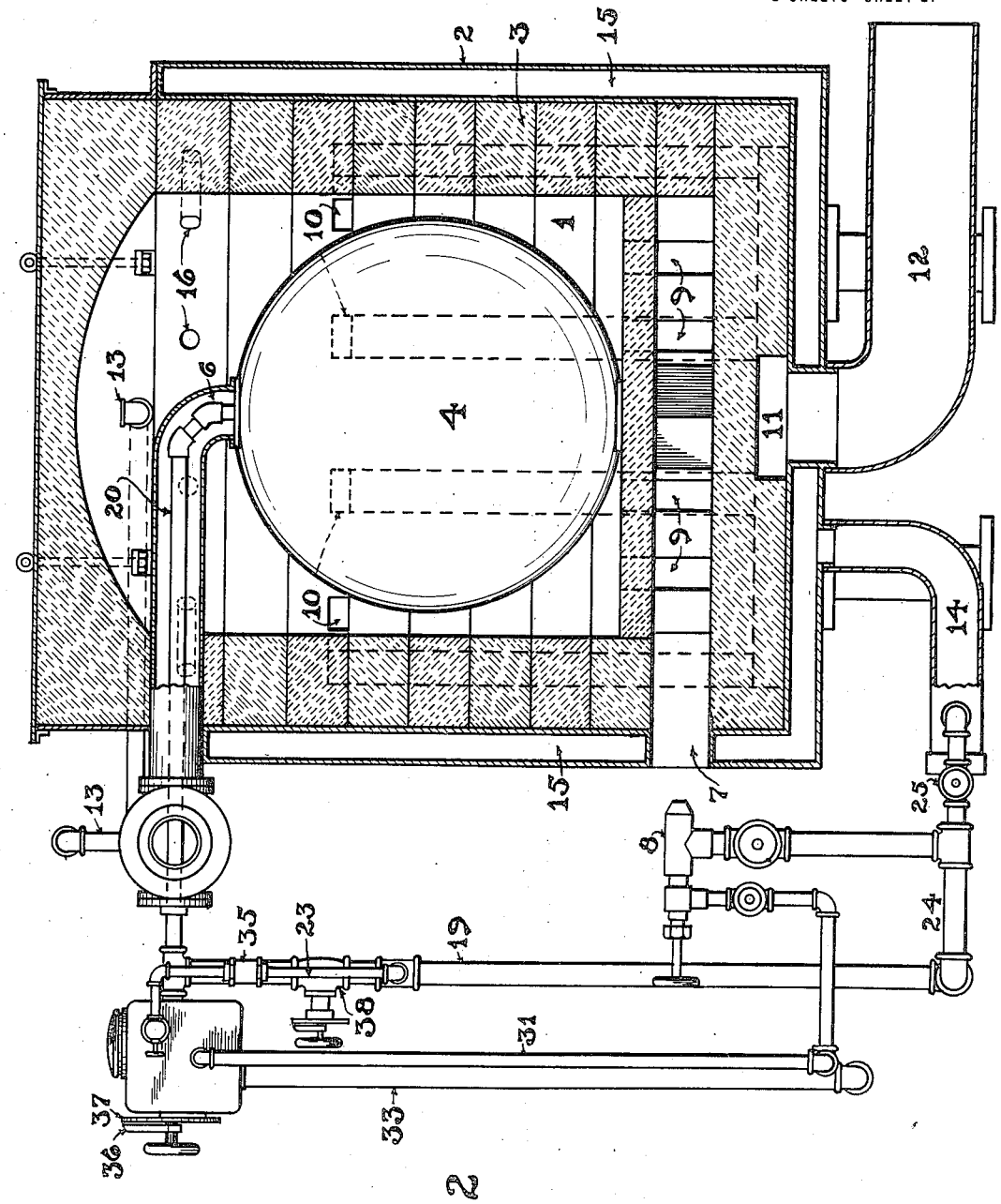

Figure 1 is a front elevation of my apparatus with certain parts shown diagrammatically. Fig. 2 is a vertical view at right angles to Fig. 1, partly in section and partly in elevation. Fig. 3 is a longitudinal, central section of my hydrocarbon injector and a section in plane of one of my converters. Fig. 4 is a section on the line $x$—$x$ of Fig. 3.

In the drawings I have shown a two-unit construction, but it will be understood that I may employ a single or any desired number of units.

A converter chamber 1 is formed preferably with a metallic casing 2 lined with a refractory material 3. Mounted upon proper supports in the chamber 1 are converters or retorts 4, their relative position to each other when more than one is employed being shown in broken outline in Fig. 1. The converters 4 are of an improved type of baffled construction, the improved features of which will be more specifically described hereafter. Hydrocarbon mixed with a combustion-supporting gas, such as air enters the passage 5, passes around the several baffles as indicated by the arrows in Fig. 3, and passes, after conversion into gas, into the gas-flue 6, whence it is carried to a gas-holder (not shown in the drawings).

In starting the apparatus, hydrocarbon and air are blown into the passage 7 from the torch 8 and the burning gases pass up through the passage 9 about the converters and heat them to the necessary temperature to cause decomposition of the vapor admixture of hydrocarbon and air into its gaseous chemical constituents. The by-products of the combustion producing this heating pass out and down through the flues 10 into the base flue 11 and out through the pipe 12 to stack or chimney.

When the converters are once heated to the temperature necessary to produce the aforesaid decomposition, gas, either from the gas-flue or from the gas-holder, is admitted through the pipe 13, the torch 8 is shut off and air is either drawn or forced into the air flue 14, up through the passage 15 in the casing and in through the holes 16 in the lining 3. Here the gas and air combine and maintain the temperature in the converter necessary to produce the gas, and the products of this combustion pass out to stack through the passages above described.

In the commercial production of gas from liquid hydrocarbon possessing a predetermined calorific value and chemical constituency, the apparatus must provide means for, first, maintaining an established ratio of hydrocarbon and air; second, maintaining such ratio for all volumes of hydrocarbon and air combined. It therefore follows that the pressure upon hydrocarbon and air must vary with equal step for all variations of volumes of production. In addition to this, the fluid pressure which will change with every change of level in the fluid tank or other container from which it is directly taken by the injector is quite sufficient to change the actual ratio between hydrocarbon and air, although the air pressure on both are the same at any given moment. To meet these conditions and requirements I employ a mixing device having a needle-valve 17 which discharges hydrocarbon into a tube 18 and a main air supply pipe 19, through a valve 38 delivers air into the pipe 20 which leads into the passage 5 in the converter 4. Air pressure may be derived from any desired common source, such as a blower 21 delivering air to a main 22 which connects with said pipe 19—it being understood that I am now describing a single-unit construction. A branch pipe 23 leads from the pipe 19 and enters the upper portion of the reservoir 42 at 23$^a$, shown in Fig. 3. A branch pipe 24 from the main 22 leads to the torch 8 and also through a valve 25 supplies air to the flue 14. Still another branch pipe 26 leads from the main 22 to the hydrocarbon tank 27 and puts pressure upon the hydrocarbon. An air pressure thus is exerted upon the hydrocarbon in the reservoir 42 and in the supply tank 27 substantially equal to the pressure of the air at its source. The pressure of the air at the point of admixture with the hydrocarbon is necessarily somewhat lower as part of the air pressure has been converted into a velocity head.

A pipe 28 leads from near the bottom of the hydrocarbon reservoir 27 to a pump 29, which may be actuated from any desired source of energy, as, for example, from the pulley-shaft which drives the blower 21. This pump forces the hydrocarbon through pipes 30 and 31 into the injector reservoir 42 at the point marked 31$^a$ in Fig. 3. An overflow 32 (see Fig. 3) has its orifice preferably just below the axis of the needle-valve 17, and connects with a return pipe 33 which leads back to the tank 27. The volume of hydrocarbon pumped is slightly in excess of the maximum consumption of the injector, so that the injector chamber is kept filled to the overflow level of the orifice of 32. The needle-valve takes its supply from a tube 34 which extends well down into the injector chamber to prevent any possible discharge of air, and the branch pipe 23 is provided with a check-valve 35 to prevent any possible back-flow of air or hydrocarbon from the injector. The stem of the needle-valve 17 is provided with a pointer 36 which is carried by the stem over the face of a fixed, graduated dial 37; and the pipe 19 which supplies air is provided with a valve 38, also provided with a pointer and graduated dial; and by means of these valves the ratio of hydrocarbon and air may be predetermined by an initial adjustment of the same, which adjustment is at the same time final for the production of a maximum output of gas of the particular calorific value and chemical constituency desired,— volumetric control of air pressure, as hereafter described, automatically taking care of a variable demand for gas or variation of air pressure due to change in speed or effectiveness of the compressor.

Upon or connected with the air main 22 is a valve 39 which has an extended lever 40 attached to its key. Adjustably secured to the float of the gas-holder (not shown) and rising and falling with the float is an arm 41, the L-shaped end of which engages under the end of the lever 40. When the float of the gas-holder rises, carrying the arm 41 up with it, it will, when the gas-holder has reached a predetermined limit, lift the lever 40 and open the valve 39. This will result in immediate reduction of the air pressure upon the hydrocarbon in the tank, in the reservoir 42, and also the pressure at the point of delivery of air for admixture with the hydrocarbon; but the ratio of discharge between air and hydrocarbon will remain constant, notwithstanding the change in air pressure and the consequent directly proportional change in volume of gas produced. With the fall of the float the valve 39 will be closed by gravitation, or otherwise, bringing about a resultant increase in air pressure and directly proportional increase in volume of gas produced.

Turning to another feature of my invention, it will be seen that the gas conduit 6 surrounds the delivery pipe 20 which delivers hydrocarbon and air to the converter. This effects the preheating of the hydrocarbon and air as they are brought together and produces a very material mechanical division of the hydrocarbon and better admixture with the air, and by this absorption of sensible and otherwise waste heat by the pipe 20, I am able to attain a very much larger percentage of fixed gas from a given quantity of hydrocarbon. This construction has also the mechanical advantage of materially reducing the temperature of the gases before they are delivered to the gas-holder.

Another feature of my invention is the construction of the converter. Heretofore it has been the practice to carry the hydrocarbon and air into the central area of the converter by a wrought-iron pipe cast in place in the converter and to take off the gases through wrought-iron pipes threaded into the periphery of the casting. Such construction, owing to the difference in coefficient of expansion, resulted invariably in cracking the converter. Furthermore, it was the practice to make the shell of the converter rectangular in cross-section, and this resulted in inequality of strain under heat, eventuating also in cracking. By reference to Figs. 3 and 4, it will be seen that I cast the tubular lead 5 integral with the baffles and merely set in the connecting pipe 20 by a shallow, taper thread. And it will also be seen that I provide a single surrounding flange to which the flange of the pipe 6 is secured. And as clearly shown in Fig. 4, I cast the shell of the converter in the shape of a flattened ellipse in cross-section. These improvements in construction avoid all danger of cracking, which objection has rendered the old type of converter inoperative and worthless.

It will be understood that my hydrocarbon injector and means for maintaining a constant liquid level in connection with a constant ratio of air pressures are adaptable to other uses than the production of gas from hydrocarbon.

While I have described apparatus illustrating one specific form of my invention I wish it to be understood that I mean by the appended claims to include various modifications of my apparatus which fall within the scope and spirit of my invention, and to cover thereby the described or equivalent apparatus for acting upon various equivalent combustibles and equivalent oxidizing gases.

Having thus described my invention, I claim:—

1. An apparatus for making a combustible gas comprising a retort, means for supplying to said retort a continuous current of a mixture in predetermined proportion of air and a hydrocarbon which is liquid at ordinary temperatures, means for varying the rate of delivery of said mixture and means for automatically maintaining said proportion substantially constant for varying rates of delivery.

2. An apparatus for making a combustible gas from oil comprising a converter, means for maintaining said converter at a temperature of combustion, a mixing device, a conduit connecting said device to the converter, conduits for supplying air under pressure and an oil to said mixing device, means for automatically delivering the oil to the mixing device at a pressure bearing such relation to the air pressure that the quantity of oil and air will be substantially constant for different air pressures, a valve for regulating the rate of oil delivery, and means for adjusting the air pressure in accordance with the demand for gas to be delivered by said converter.

3. An apparatus for making gas comprising the combination of a converter, a mixing device, a conduit connecting said device to the converter, means for supplying air under pressure, and a hydrocarbon oil to said mixing device, means for automatically maintaining the oil pressure at such relation to the air pressure that a mixture of air and oil is delivered by said device in substantially constant proportions for varying air pressures, a valve for adjusting said proportion, and means for varying the air pressure.

4. In an apparatus for making gas, the combination of a mixing device, conduits for conveying air and a combustible to said mixing device, an air pump connected to said air conduit, a pump for delivering combustible, a valve for predetermining the proportion of air and combustible admitted by said device at a given air pressure, means for varying the air pressure, and means for controlling the delivery of the combustible in accordance with the variation of air pressure to maintain the said proportion substantially constant.

5. The combination of a mixing device, conduits for conveying air under pressure and a combustible to said mixing device, a valve for predetermining the proportion of air and combustible admitted by said device at a given air pressure, means for automatically controlling the delivery of the combustible in accordance with the air pressure to maintain the said proportion substantially constant for different air pressures, a retort for subjecting the mixture of air and combustible to a temperature of combustion to partially burn the same, a conduit for conveying away the products of said combustion, a gasometer connected to said conduit, and means for automatically adjusting the pressure of the delivered air to maintain said gasometer filled with gas to a predetermined volume with a varying demand.

6. The combination of a mixing device having inlets for air and a combustible, a conduit for conveying air under pressure to said device, means for delivering a liquid combustible, at a substantially constant level so close to the inlet point of the mixing device that the hydrostatic head to be overcome in discharging said combustible is negligibly low, means for introducing said combustible into the mixing device at a pressure proportioned to the air pressure to maintain a predetermined ratio between the combustible and air, means for varying the air pressure, a retort, a conduit for conveying the mixture from the mixing device to the retort and means for conveying away gaseous products from the retort.

7. The combination of a mixing device, conduits for conveying respectively air under pressure and a liquid combustible thereto, means for varying the air pressure, means for predetermining the proportion of air and combustible admitted by said mixing device, and means for automatically controlling the delivery of the combustible to the mixing device to maintain said proportion substantially constant for different air pressures.

8. The combination of a mixing device, conduits for conveying air under pressure and oil thereto, means for varying the air pressure, means for predetermining the proportion of air and oil admitted by said mixing device for a given air pressure, and means for automatically controlling the delivery of the oil to the mixing device by the air pressure to maintain said proportion substantially constant for different air pressures.

9. The combination of a mixing device having inlets for air and oil, means for delivering oil against a negligibly low hydrostatic head to the oil inlet of said device, means for introducing air under pressure to said device, means for introducing said oil at a predetermined and maintained ratio to the air into said device, and a conduit for conducting away the resulting mixture.

10. The combination of a mixing device having inlets for air and oil, means for delivering air under pressure to the air inlet, means for delivering oil against a negligibly low hydrostatic head so close to the oil inlet of said device that fluctuations of delivery due to friction and inertia are substantially absent, means for introducing said oil into the mixing device at a pressure bearing such relation to the air pressure as to maintain the oil at a predetermined quantitative ratio to the air, means for varying the air pressure, and means for conducting away the resulting mixture.

11. An apparatus of the type described for making gas from liquid hydrocarbons comprising, in combination with a converter, a mixing device having a reservoir, a supply pipe leading into said reservoir and an overflow pipe leading from said reservoir, a supply tank and a pump for forcing hydrocarbon from said tank into said reservoir, an air compressor and a main leading therefrom with one branch pipe leading to said tank, another leading to said reservoir, and the third leading to the admixture chamber of said injector, a pipe connecting an outlet of the mixing device with the converter, and a gas outlet pipe for the converter.

12. The combination of a mixing device, a reservoir, an inlet from said reservoir to the mixing device, a supply tank, means for conveying oil from said tank to said reservoir, substantially level with said inlet, an air compressor, a main pipe connecting said compressor and the mixing device, a branch pipe connecting said main pipe with the oil reservoir, another pipe leading to the supply tank, and means for varying the air pressure.

13. The combination of a mixing device, a reservoir adjoining said mixing device, a communicating conduit, a valve in said conduit, a supply tank, a pump for conveying oil from said tank to said reservoir, an overflow pipe to maintain the oil level in said reservoir substantially constant and close to the valve in the communicating conduit, an air compressor, a main pipe connecting said compressor and the mixing device, a branch pipe communicating with said pipe and the oil reservoir, another branch pipe communicating between the main pipe and the supply tank, and means for varying the air pressure.

14. An apparatus for making a combustible gas from a hydrocarbon oil, comprising the combination of a converter, a mixing device having hydrocarbon and air inlets, and an outlet, a conduit connecting said mixing device at the outlet to the converter, a conduit for supplying air under pressure, an oil reservoir adjacent the mixing device, independent means for maintaining therein a supply of oil at a substantially constant level so close to said oil inlet that the friction and hydrostatic head of a communicating oil column is negligible, a branch conduit leading from said air conduit to the oil reservoir, means for delivering air under pressure to said air conduit and means for varying the air pressure.

15. In a means for feeding liquid fuel to a vaporizer or gasifier, the combination of a conduit for delivering air, a conduit for delivering a liquid fuel, an air pump connected to said air conduit, a pump for delivering said fuel, valves for regulating the proportion of air and fuel admitted to said conduits, means for regulating the air pressure, and means for automatically controlling the delivery of the fuel by said air pressure to maintain the said proportion substantially constant for different pressures.

16. A means for feeding a liquid combustible comprising the combination of an ejector tube having an inlet, means for delivering said combustible against a negligibly low hydrostatic head so close to the inlet of said tube that fluctuations of delivery due to friction and inertia are substantially absent, a conduit delivering air under pressure, means for introducing the combustible into the ejector tube at a pressure bearing such relation to the air pressure as to maintain the combustible at a predetermined quantitative ratio to the air for different air pressures, and means for regulating the air pressure.

17. In a means for feeding liquid fuel, the combination of an ejector tube, a reservoir, an inlet from said reservoir to the ejector tube, a supply tank, means for conveying the fuel from said tank to said reservoir, an overflow tube substantially level with said inlet, an air compressor, an air conduit outside said ejector delivering air at the mouth of said tube, a main pipe connecting said compressor and the air conduit, a branch pipe connecting said main pipe with the fuel reservoir, another pipe leading to the supply tank, and means for regulating the air pressure.

18. In a device for feeding liquid fuel, the combination of an ejector tube, a reservoir adjoining said tube, a communicating conduit, an adjustable valve in said conduit, a supply tank, a pump for conveying the fuel from said tank to said reservoir, an overflow pipe to maintain the liquid fuel level in said reservoir substantially constant and close to the valve in the communicating conduit, an air compressor, an air conduit delivering air close to the mouth of said ejector tube, a main pipe connecting said compressor and the ejector tube, a branch pipe communicating with said pipe and the fuel reservoir, another branch pipe communicating between the main pipe and the supply tank, and means for regulating the air pressure.

WALTER CLINT DAYTON.

Witnesses:
BERTHA V. DAYTON,
MARGIE NIELSEN.